United States Patent Office 3,106,188
Patented Oct. 8, 1963

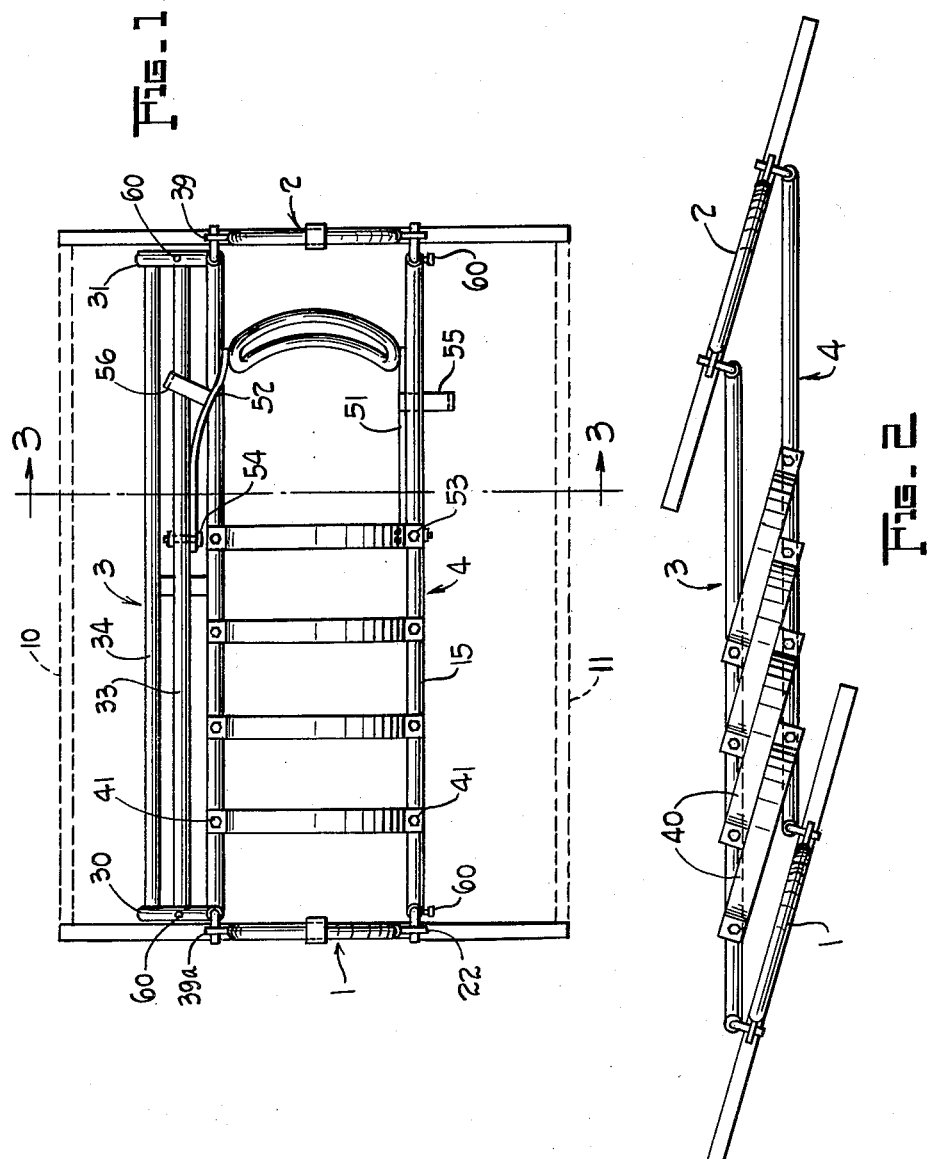

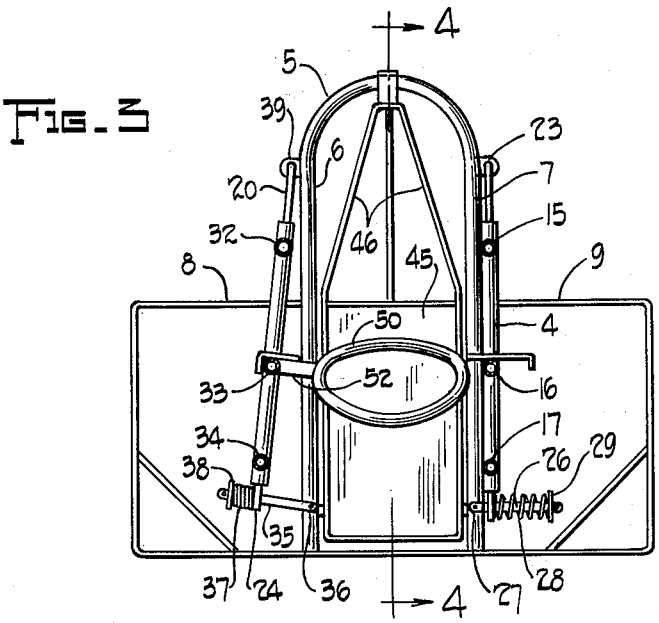
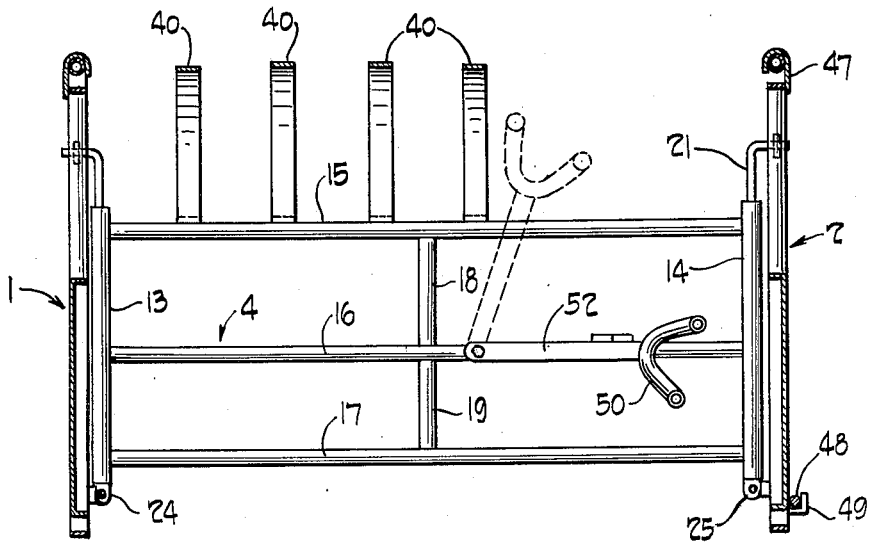

3,106,188
FARROWING PEN
Paul H. McMurray, 204 W. North St., Delphi, Ind.
Filed Oct. 12, 1961, Ser. No. 144,608
12 Claims. (Cl. 119—20)

This invention relates to farrowing pens and primarily to novel construction of the same which make such pens valuable to the farmer in view of the safety features incorporated therein and yet of simple construction making the same particularly valuable for the sow and small pigs during the early days of the small pig lives.

While farrowing pens have been constructed in many different forms, the farrowing pen hereof is intended to provide many novel features which are valuable from the standpoint of confining the sow in an area which will permit her to stand up and lie down at ease in view of the generally expansible nature of the pen as to the portions thereof which would be required to be expansible, and further to provide means for confining the sow at one end to permit the small pigs to roam around in rear of the sow, the confining means likewise being particularly useful during the birth of the small pigs.

A novel feature of the pen according to the invention hereof, resides in the construction of the sides thereof wherein the same are of generally resilient nature to permit the end to in effect expand or contract as the case may be in accordance with the direction in which the sow lies down and yet permit access to the sow by the small pigs for nursing, maximum comfort being a primary feature hereof.

A particular object of this invention is to provide a farrowing pen of simple construction which is collapsible so that it may be transported at will, and yet can be readily set up and quickly usable for farrowing purposes as will be readily understood.

A further object of this invention is to provide a farrowing pen in which the side portions thereof are resiliently mounted so that the same may expand and contract in accordance with the movements of the sow and yet limit her in her movements at the same time to prevent the small pigs from being trampled at any time during their early lives.

A further particular object of this invention is to provide a novel guard unit which will facilitate the birth of the pigs and at the same time confine the sow so that after birth the small pigs are able to move back and forth within the pen area with considerably less likelihood that they will be trampled upon and thus harmed as is often the case in ordinary farrowing pen construction.

A more particular object of this invention is to provide a guard unit which is adaptable to be raised and lowered so that the sow may be removed or permitted to leave the pen area, after birth of the pigs therein.

Another object of this invention is to provide a pen construction which will permit a series of the pens to be arranged side by side so that as conditions demand more or less of the units may be availed of for farrowing purposes and subsequent thereto the pens be folded up or removed if necessary or desirable.

Other and further objects of the invention will be understood from a consideration of the specification appended hereto and disclosed in the drawings wherein:

FIGURE 1 is a top plan view of a pen constructed in accordance with this invention.

FIGURE 2 is a top view showing the pen of FIGURE 1 folded for storage or transport.

FIGURE 3 is a sectional view taken about on the line 3—3 of FIGURE 1 looking in the direction of the arrows.

FIGURE 4 is a longitudinal sectional view taken about on the line 4—4 of FIGURE 3 looking in the direction of the arrows.

Referring now to the drawings, and particularly FIGURES 1 and 3, the pen hereof is constructed of spaced end sections 1 and 2 and a pair of side units 3 and 4 connected to the end units in a manner to be described more specifically hereinafter.

The end units 1 and 2 are substantially identical, and for the purposes hereof therefore the unit 2 will be described in detail and is shown in FIGURE 3 as comprising a central tubular arch member 5 with legs 6 and 7 which extend substantially vertically and are in turn equipped with wings 8 and 9 respectively, these wings or wing members being generally rectangular and of any preferred construction so that side boards such as indicated in FIGURE 1 at 10 and 11 may be fastened thereto in any preferred manner, the boards of FIGURE 1 and denoted 10 and 11 being shown in dotted lines since they may or may not be provided in accordance with the wishes of the user of the pen.

The side units will next be described, and again while these are substantially identical, they are generally formed of tubular parts as indicated in FIGURE 4, the vertical parts of the side unit as for example shown in FIGURE 4 being tubular and denoted 13 and 14 with longitudinal tubular members 15, 16 and 17 connected thereto in any preferred manner as by welding or otherwise, central parts 18 and 19 likewise being attached to the members 15, 16 and 17 in any preferred manner to increase the rigidity of the side unit disclosed and being described as the side unit 4.

The parts 13 and 14 are intended to receive there within the downwardly extending rod parts 20 and 21, as indicated in FIGURE 4, these parts being pivotally connected with ears 22 and 23 and the lower ends of the rods 20 and 21 being equipped with eye sections 24 and 25 respectively, such sections being intended to have extending therethrough certain spring mounting parts as seen in FIGURE 3 and denoted 26 for example, this part being duplicated at the opposite end as will be readily understood and pivotally mounted at 27 with a compression spring 28 surrounding the same and pressing against the eye such as 24 for example with the opposite end of the spring engaging a washer and pin stop 29.

The side unit 3 is constructed identically to the side unit 4 just heretofore described, including the vertical pipe parts 30 and 31 and the transverse or longitudinal pipes 32, 33 and 34, a spring mounting member 35 being pivotally connected at 36 to the vertical leg 6 of the arch member 5. A spring 37 with washer and pin combination 38 as a stop is likewise provided the eye portion of the rod 20 being denoted 24 as was true before since all these rods are identical and pivotally mounted in the ears of the end members. Ears 39 and 39a are provided for the side part 3 and the rods pivotally connected thereto as for the side unit 3.

It may be further noted that by reason of the construction these side units 3 and 4 are pivotally supported to swing outwardly at the bottom thereof around the pivots afforded by the ears such as 23 and 39 previously mentioned.

Extending between the longitudinal pipe members 15 and 32, are the cross members 40, these being substantially identical and of semicircular configuration having means such as the bolts 41 at opposite ends to attach the cross members 40 to the pipes 15 and 32. These cross members 40 are designed to prevent the sow from upward movement in the pen as will be readily appreciated. There are preferably four of these members provided spaced in the manner about as indicated in FIGURE 4 and all similarly fixed to the pipes 15 and 32 so that the same are removable hence permitting transportation of the pen in a manner to be subsequently set forth.

The end sections includes gates therein as has been previously suggested, these gates being provided in the form of rectangular body parts 45 provided at the upper edge thereof with upwardly and converging mounting parts 46 these in turn engaging a hook-like member 47 to be suspended over the arch member 5. The lower portions of the body 45 are equipped with outwardly extending rod members 48, there being one of these at each side which in turn are received in hook parts such as 49. It will thus be noted that by raising upwardly on the gate the same may be disconnected from the arch and permitted to swing outwardly or be moved outwardly since the parts 48 will be disengaged from the hooks 49 likewise.

Referring now to FIGURES 3 and 4, the guard unit generally designated 50 will be described, and as seen is formed of a peculiarly shaped tubular part which is intended to prevent rearward movement of the sow, this tubular part 50 being connected to arms 51 and 52, these arms 51 and 52 being pivotally connected at 53 and 54 respectively with limiting stops 55 and 56 being formed on the arms 51 and 52 respectively whereby the unit is normally positioned about as seen in FIGURE 4 to provide a rearward limiting means for the sow, to permit the small pigs to pass in rear of the guard unit after they are born and this guard unit preventing the sow from moving too far to the rear of the pen and thus obviating her stepping on or otherwise crushing the small pigs.

When the guard unit has served its purpose or if the sow is to be removed it may be swung into the dotted line position as shown in FIGURE 4. It will also be clear as viewed in FIGURES 1 and 3 that when the side unit 3 for example is moved out pivotally against the spring 37 that the guard unit is of resilient form as to the arm 52 thereof permitting this swing movement and the limiting means 56 still prevents the guard unit from dropping downwardly out of operative position.

The resilient construction of the side units is such as to permit the sow to stand up, lie down and turn as necessary yet of resilient enough nature to permit the small pigs to move outwardly beneath the same since the lowermost pipes 17 and 34 are spaced from the buttom of the pen area as will be readily understood and yet the sow can roll if necessary with the side units being yieldably arranged for that purpose.

If necessary and if found desirable, by removal of the guard unit, the pen may be folded about as shown in FIGURE 2 since the rods 20 and 21 for example permit the pipes 13 and 14 to rotate thereon and thus permit the side units to come into juxtaposition about as indicated in the said figure. This will be valuable for shipment purposes and storage when the pens are not needed as will be readily understood.

In the mounting of the side units 3 and 4, the pipes 30, 31, 13 and 14 includes set screws such as indicated at 60 in FIGURE 1, all the set screws being identical and located in substantially identical positions in respective end pipe members, whereby the said members upon loosening the set screws may be raised and lowered on the rods 20 and 21 for example as respects the pipes 13 and 14 respectively, whereafter manipulation of the set screws will permit the same to be tightened and maintain the entire side part in its raised position. It will thus be understood that as the small pigs grow older the side parts may be raised and positioned by the set screws so that they may still have access to the sow for nursing purposes and yet the sow will still be confined within the central portion of the pen area.

I claim:

1. In a farrowing pen of the class described, in combination, spaced end sections, and a pair of side units connected therewith, a pen being formed thereby, at least one of said units including a side part swingably mounted at an upper portion thereof, and means for swingable mounting thereof on said end section whereby the unit will move outwardly at the lower portion thereof to increase the effective area of said pen, limit means being connected thereto.

2. The combination as claimed in claim 1, wherein the lower portion of the side part is resiliently restrained.

3. In a farrowing pen of the class described, in combination, spaced end sections, and a pair of side units connected therewith to form a pen area, at least one of said units including a resiliently mounted part mounted by means to yield within limits when pressure is applied thereto.

4. The combination as claimed in claim 3, wherein the part will yield outwardly.

5. The combination as claimed in claim 3, wherein the part is pivotally mounted at its upper edge, and the lower portion will swing outwardly to a limited extent.

6. The combination as claimed in claim 3, wherein the side units are pivotally connected to the end sections by generally vertical pivot means, and thereby facilitate positioning the said units adjacent one another.

7. The combination as claimed in claim 3, wherein both side units include a resiliently mounted part to move as stated, and cross members are connected thereto and extend transversely.

8. The combination as claimed in claim 1, wherein the spaced end sections and a pair of side units form a pen area wherein a guard unit is connected to the side units near an end of the area, said unit including means to engage the rear of an animal in the area and restrain further rearward movement of the animal whilst facilitating movement of smaller animals therebeyond.

9. The combination as claimed in claim 8, wherein the guard unit includes means for mounting the same whereby to be moved out of animal engaging position.

10. The combination as claimed in claim 3, wherein the part is mounted in the unit by means facilitating varying the vertical position of said part.

11. The combination as claimed in claim 8, wherein the guard unit includes means facilitating pivotal movement of the guard unit out of animal engaging position.

12. The combination as claimed in claim 3, wherein at least one of the end sections includes a gate member and means for removably supporting the gate member in said section.

References Cited in the file of this patent

UNITED STATES PATENTS

| | | |
|---|---|---|
| 1,737,211 | Barker | Nov. 26, 1929 |
| 2,630,097 | Johansen | Mar. 3, 1953 |
| 2,800,103 | Bleeker | July 23, 1957 |
| 2,993,471 | Meyer | July 25, 1961 |